ial and more particularly to mounting means therefor.

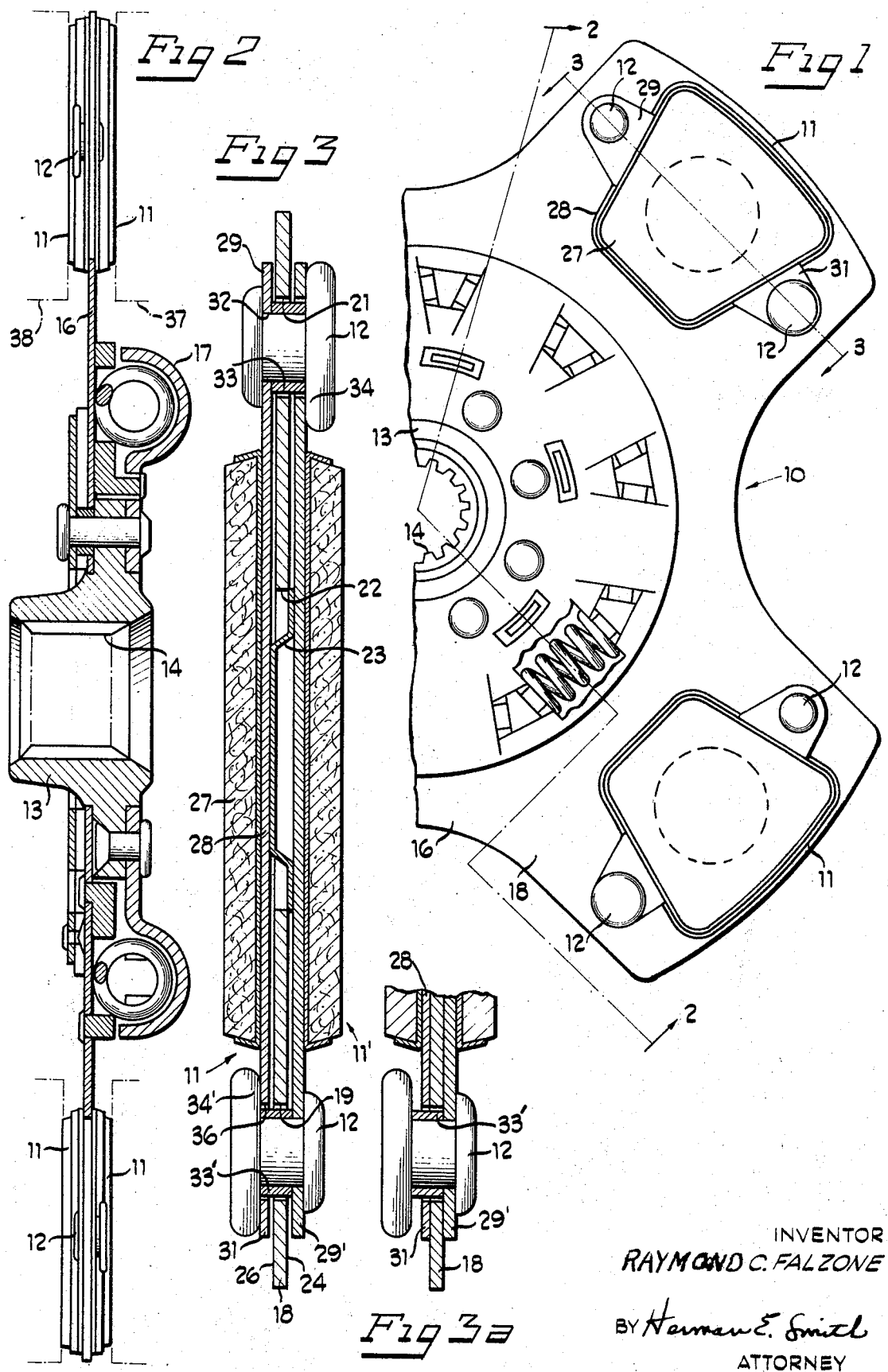

United States Patent Office 3,526,307
Patented Sept. 1, 1970

3,526,307
FRICTION MEMBER
Raymond C. Falzone, Rockford, Ill., assignor to Borg-Warner Corporation, Chicago, Ill., a corporation of Delaware
Filed July 29, 1968, Ser. No. 748,293
Int. Cl. F16d *13/60*
U.S. Cl. 192—107           4 Claims

ABSTRACT OF THE DISCLOSURE

A friction member has right and left hand mounting ears, one ear is arranged to be secured to a stud-like mounting member and the other ear is arranged to slide over a similar mounting member, such that a pair of identical friction members mounted back to back provide an interlocking assembly permitting movement of the friction members toward and from each other.

SUMMARY OF THE INVENTION

The present invention relates generally to friction material and more particularly to mounting means therefor.

Where friction pads are employed for the transmission of power such as in a releasable friction clutch mechanism, it is desirable to provide means for softening the engagement of the clutch members as they are brought together. Various flexible mountings are available for softening the engagement of the clutch member, however many prior devices employ complex spring arrangements and/or result in a slanted orientation of the friction pads such that the friction pads become beveled as slip occurs during an initial portion of the engagement of the clutch member. The beveled friction pad is then subjected to unequal pressure across its face as full engagement takes place.

It is an object of the present invention to provide improved mounting means for friction pads which promotes parallelism between the friction pads and associated clutch members. A further object of the invention is to provide improved mounting means for friction pads which permits the mounting of identical pads in back to back pairs forming an interlocking-assembly in which the pair of pads are guided for movement toward and from each other.

Other objects and advantages of the invention will become apparent from a consideration of the following description of a preferred embodiment thereof together with the drawing.

BRIEF DESCRIPTION OF THE DRAWING

FIG. 1 is a fragmentary plan view of a clutch plate having friction members mounted thereon in accordance with the invention;

FIG. 2 is a section view taken along the line 2—2 of FIG. 1;

FIG. 3 is a section view, to enlarged scale, taken along the line 3—3 of FIG. 1; and FIG. 3a is a fragmentary view showing the position of the mounting tabs when the pair of friction members are clamped together.

DESCRIPTION OF THE PREFERRED EMBODIMENTS

Referring now in greater detail to the drawing, the reference character 10 indicates a clutch plate for use in a friction clutch assembly, having a plurality of identical friction members or units 11 mounted thereon by means of fasteners 12.

Clutch plate 10 includes a hub 13 having splines 14 therein, providing means for connecting clutch plate 10 to a rotary shaft for the transmission of torque. A disk-like portion 16 extends around and is connected to hub 13 by means of a damper assembly 17. Disk 16 includes four radially extended portions 18, only two of which are shown in FIG. 1. Each radially extended portion 18 of plate 10 includes a pair of spaced apertures 19, 21, and a central opening 22, facilitating the mounting of a pair of friction members 11, 11' in back to back relationship. A spring 23 is arranged in opening 22 and bears against the backs of a pair of friction members 11, 11', urging them outwardly away from each other.

Each friction member 11 is identical in construction regardless of whether it is mounted adjacent face 24 or face 26 of clutch plate 10. Each friction member or unit 11 includes a friction pad 27 secured to a backing plate 28. Backing plate 28 has right hand ear or mounting tab 29, and left hand ear or mounting tab 31, extending outwardly from the edges of friction pad 27. Right hand mounting tab 29 includes a mounting aperture 32 through which one of the fasteners 12 extends. A guide collar 33 projects perpendicularly from mounting tab 29 and is secured in place by a fastener 12. Guide collar 33 serves as a spacer for determining the spacing of shoulder 34 from backing plate 28. Left hand mounting tab 31 includes a guide aperture 36 arranged to slide on a similar guide collar 33' extending from the right hand tab 29' of the other friction member 11'. Guide collars 33 and 33' provide a driving connection between the friction member 11, 11' and the clutch plate 10. Preferably guide collars 33, 33' are fabricated from high carbon steel and hardened for high strength and low wear qualities.

The pairs of friction members 11, 11' are normally held apart by means of the spring 23 in engagement with the shoulders 34, 34' of the fasteners 12. Upon engagement of a clutch including the clutch plate 10, the back to back assembly of the pair of friction members 11, 11' becomes clamped between a fly wheel 38 and pressure plate 37 of the clutch assembly. As clamping engagement occurs the entire face of each friction pad 27 engages the associated faces of the fly wheel and pressure plate. As clamping engagement continues, spring 23 is compressed permitting friction members 11 and 11' to move toward each other. Thus throughout clutch engagement the faces of the friction pads 27 remain parallel with the associated faces of the fly wheel and pressure plate such that the full area of the friction pads is effective both during the initial portion of clutch engagement for minimizing wear when slip occurs, and after full engagement when it is desired to transmit maximum torque.

While the invention has been shown and described in terms of a preferred embodiment, various changes in the design and arrangement of parts are included within the spirit of the invention.

I claim:

1. A clutch plate including a pair of spaced apertures, having a pair of identical guide members slidably extending therethrough, and having a pair of identical friction members mounted back to back disposed on opposite faces of said clutch plate, each of said friction members including a backing plate having a friction pad secured thereto, said backing plate including a pair of spaced mounting tabs disposed adjacent opposite edge portions of said friction pad, one mounting tab of each friction member being adapted to carry one of said guide members projecting perpendicularly therefrom, the other mounting tab of each friction member including a guide aperture arranged to slidably embrace one of said guide members, whereby said pair of friction members are engageable with said clutch plate and with each other by means of said pair of guide members for aligned guided movement toward and from said clutch plate.

2. A clutch plate according to claim 1 in which said one mounting tab of each friction member is provided with a hollow collar projecting perpendicularly therefrom defining one of said guide members.

3. A clutch plate according to claim 1 in which said one mounting tab of each friction member includes a mounting aperture adapted to receive a perpendicularly projecting fastening means, said one mounting tab being provided with a perpendicularly projecting hollow collar alignable with said mounting aperture defining one of said guide members.

4. A clutch plate according to claim 1 including an opening located between said spaced apertures, and having a spring member extending therethrough in engagement with said friction members urging said friction members away from each other, said one mounting tab of each friction member including a mounting aperture and having a hollow collar projecting perpendicularly therefrom defining one of said guide members, said clutch plate having a pair of fastening members, each extending through one of said mounting apertures and through one of said collars and having a shoulder engageable with said other mounting tab effective to limit movement of said friction members away from each other.

References Cited
UNITED STATES PATENTS

| | | | |
|---|---|---|---|
| 2,767,817 | 10/1956 | Davis | 192—107 |
| 2,904,138 | 9/1959 | Wilson | 188—251 |
| 2,943,713 | 7/1960 | Salak | 192—107 X |
| 2,986,252 | 5/1961 | Bois. | |

BENJAMIN W. WYCHE III, Primary Examiner

U.S. Cl. X.R.

188—218